No. 654,710. Patented July 31, 1900.
M. R. CAPPS.
MACHINE FOR BRAZING CAN CAPS AND COLLARS TOGETHER.
(Application filed Nov. 7, 1899.)
(No Model.) 2 Sheets—Sheet 1.

Witnesses:
H. B. Hallock.
J. Williamson

Inventor
Milton R. Capps
By [signature] Atty.

No. 654,710. Patented July 31, 1900.
M. R. CAPPS.
MACHINE FOR BRAZING CAN CAPS AND COLLARS TOGETHER.
(Application filed Nov. 7, 1899.)
(No Model.) 2 Sheets—Sheet 2.
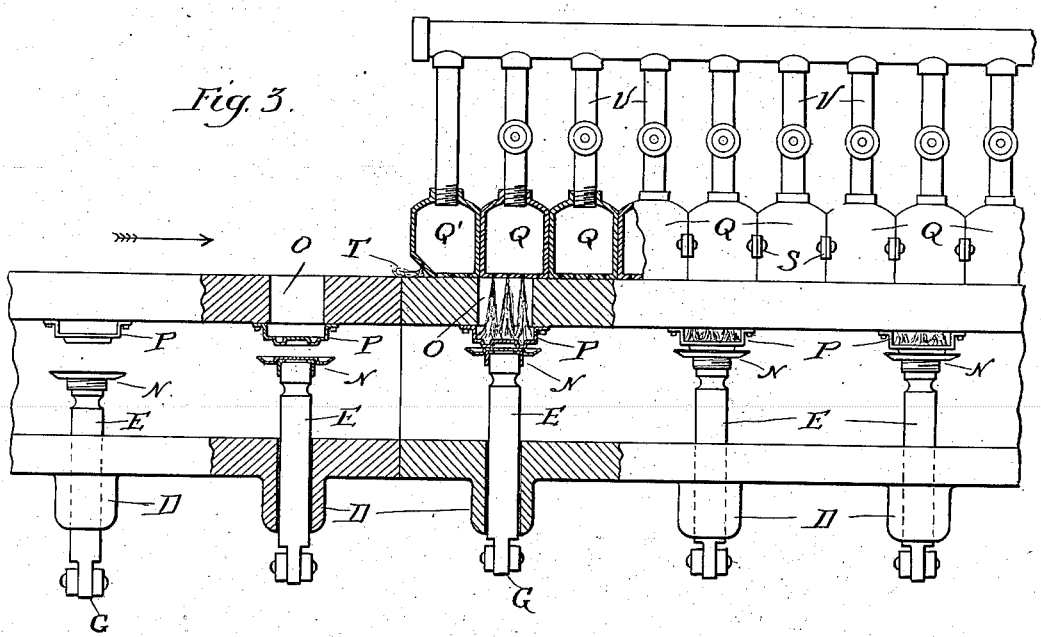
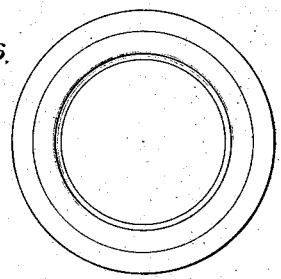
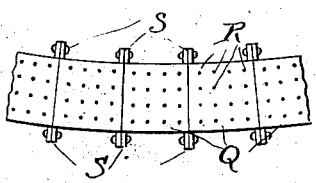
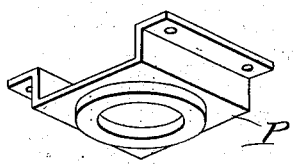
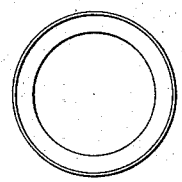
Witnesses:
H. B. Hallock.
S. Williamson
Inventor:
Milton R. Capps.
By Gurle Hazelton
Atty.

United States Patent Office.

MILTON R. CAPPS, OF PHILADELPHIA, PENNSYLVANIA.

MACHINE FOR BRAZING CAN CAPS AND COLLARS TOGETHER.

SPECIFICATION forming part of Letters Patent No. 654,710, dated July 31, 1900.

Application filed November 7, 1899. Serial No. 736,203. (No model.)

*To all whom it may concern:*

Be it known that I, MILTON R. CAPPS, a citizen of the United States, residing at Philadelphia, in the county of Philadelphia and State of Pennsylvania, have invented a certain new and useful Improvement in Machines for Brazing Can Caps and Collars Together, of which the following is a specification.

My invention relates to a new and useful improvement in machines for brazing the threaded collars to the closing-caps of shipping-cans for oil and the like, and has for its object to increase the efficiency of such machines by providing for automatically applying the necessary heat to the collars and caps to braze them together.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
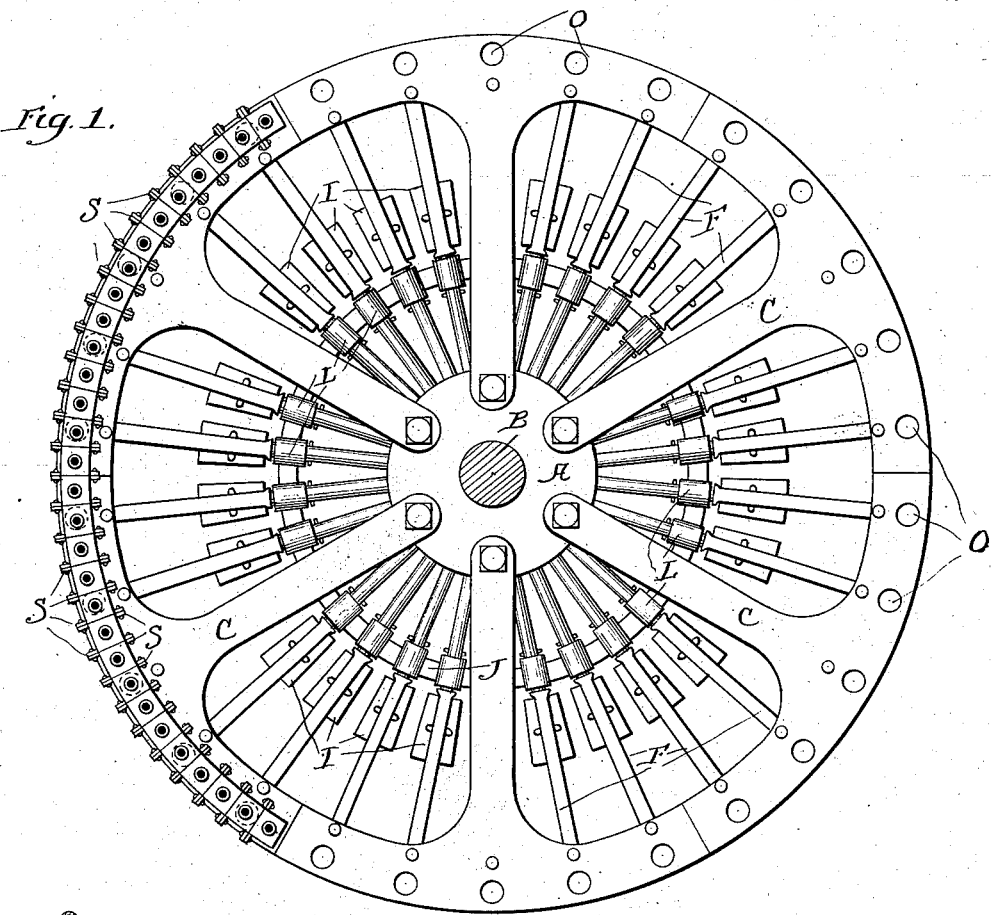
Figure 2:
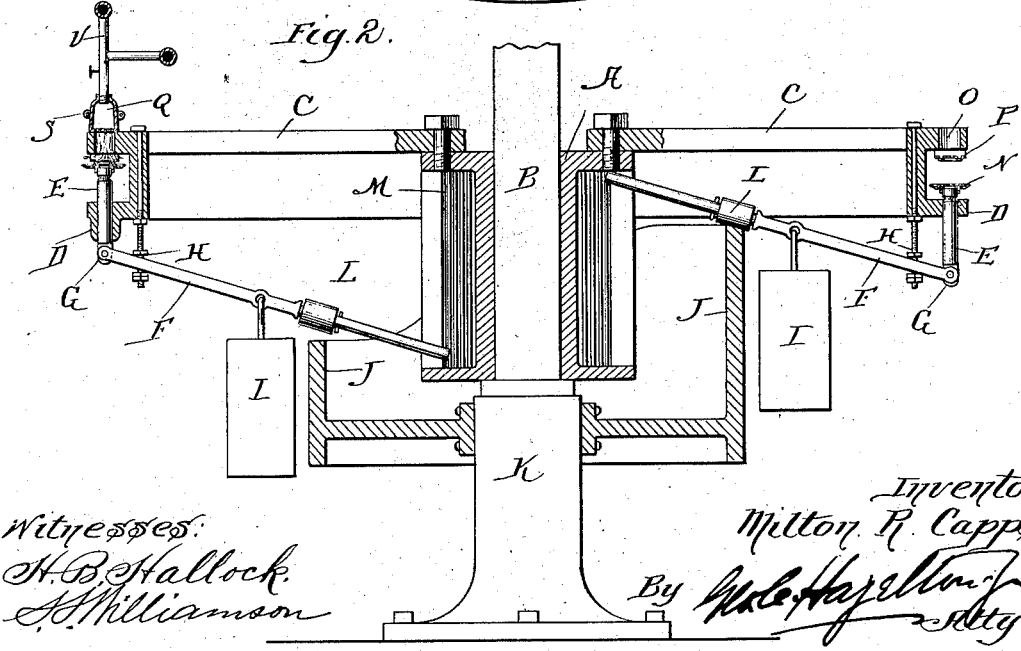

Figure 1 is a plan view of the turn-table of the machine, showing the gas-heaters extending around a portion of its circumference; Fig. 2, a vertical section showing said table and the mechanism carried thereby for operating the plungers which force the cap and collar against the heated surface, also showing one of the gas-heaters in section; Fig. 3, an enlarged view of a portion of the turn-table and gas-heaters, both being partially sectioned, so as to fully illustrate the manner in which the caps and collars are subjected to the action of the heaters for forcing them together; Fig. 4, a detail bottom view of several of the gas-heaters; Fig. 5, a detail perspective of the brazing-iron against which the heat of the burners is directed and by means of which the proper amount of heat is transmitted to the collars and caps; Fig. 6, a plan view of one of the caps; Fig. 7, a central section thereof; Fig. 8, a section of one of the collars, and Fig. 9 a plan view thereof.

In carrying out my invention as here embodied I utilize for the most part the form of machine now in use for brazing the collars and caps together, which consists of a hub A, mounted upon a central stationary spindle B, which hub carries a turn-table C, adapted to be revolved by suitable mechanism, and this turn-table is provided at its outer circumference with depending brackets D, in which are fitted the plungers E, adapted to slide vertically, and these plungers have pivoted thereto the levers F, as indicated at G, said levers being fulcrumed at H and having suspended therefrom the weights I. This arrangement provides for the raising and lowering of said plungers by the actuation of the levers, which is accomplished automatically by the stationary cam J, secured to the base K, suitable antifriction-rolls L being journaled upon the levers, so as to facilitate the travel of the levers upon the cam. The inner ends of the levers are held against lateral displacement by the vertical guide-strips M. The upper ends of the plungers terminate in heads N for the reception of the collars, by means of which said collars and the caps laid thereon may be carried with the plungers in their rotation with the turn-table.

As thus far described the machine is the same as now used for brazing the caps and collars together; but heretofore it has been necessary to place a brazing-iron by hand upon each cap and leave it in contact with the cap until the brazing was effected and then remove said iron by hand. This of necessity made the operation of the machine comparatively slow, while at the same time requiring three operators to perform this work; but by my improvement, which will next be explained, this difficulty is entirely obviated and the machine made automatic.

I form in the outer portion of the turn-table a series of holes O, each of which corresponds in position with one of the plungers, and beneath each of these holes is secured a brazing-iron P. A series of gas-heaters Q are located immediately above the turn-table, the lower faces thereof bearing against the upper surface of said table, and these heaters are provided with the perforations R, from which the air-mixed gas issues, and when lighted each of the jets of gas forms a flame which when protected against the brazing-irons heats them to a sufficient degree to bring about the brazing, as will be hereinafter set forth. The heaters extend to about one-third of the circumference of the turn-table, each being secured to those next adjacent by suitable bolts passed through the ears S, so that when the table revolves each of the holes O will successively pass beneath all of the heaters, thereby subjecting the brazing-irons to the gas-flames issuing from said heaters, thus insuring the proper temperature of said irons for producing the brazing, and the heater Q', which is located at the beginning of the series of heaters, has its outer edge beveled, so as to provide for the pilot-flame T, which remains lighted during the operations of the machine, so that when the rotations of the turn-table carry hole O beneath the heater Q' the jets of gas issuing therefrom will be ignited from the pilot-flame, and as the hole passes from beneath this heater the jets will be cut successively off by the upper surface of the turn-table, which acts as a slide-valve therefor, while at the same time the jets issuing from the perforations of the next adjacent heater will be lighted by the last of the jets of the heater Q'. By the continued rotation of the table this process will be repeated from one heater to another throughout the entire series, thus gradually raising the temperature of the brazing-iron until completing the brazing of the cap to the collar. In feeding the machine a single operator places a collar in an inverted position upon each of the heads N and places a cap upon the top of each collar, the cap being countersunk, as indicated at U, so as to be guided in place upon the collar, and this feeding is done while the table is revolving and upon the side at which the plungers are drawn downward to their lowest limit. After the collars and caps have been fed to the machine the revolving of the turn-table will carry the levers traveling upon the cam J to that portion of the cam which permits the inner end of said levers to move downward, which is effected by the weights I. This downward movement of the inner portion of the levers forces the plungers outward, as is obvious, and thus carries the caps against the brazing-irons, where they are held during a sufficient portion of the revolution of the table to effect their welding, as before set forth, when they are released by the levers again riding up upon the cam J, and they may then be removed by the operator which fed them to the machine or by another operator, if found necessary.

It is to be noted that the caps and collars are made of tin, which serves to unite the two when the proper heat and pressure are brought to bear thereon, as is well understood.

The suitable admixture of gas and air is conveyed to the heaters by the pipes V, which may be provided with valves for the regulation of the flow of said gas and air.

By the arrangement of the heaters as here shown a greater or less number may be used in the series by removing the end heaters or adding others thereto, it being only necessary to couple or uncouple the joints formed by the ears.

In use my improvement saves at least two operators in operating the machine, while at the same time increasing its capacity by permitting it being run at a higher rate of speed, and the work produced by the machine is improved in quality.

Of course I do not wish to limit myself to the exact details of construction here shown, as these may be varied within certain limits without departing from the spirit of my invention.

Having thus fully described my invention, what I claim as new and useful is—

1. In combination with a machine of the character described, a turn-table having a series of holes formed therein, a series of brazing-irons secured beneath the holes and adapted to receive the caps when forced upward by the plungers, a series of heaters located above the table and so arranged that said table acts as a valve to cut off the flow of gas except when the holes register with said heaters, whereby the flames issuing from the heaters are successively subjected against the brazing-irons, as and for the purpose set forth.

2. The herein-described combination of a rotary turn-table having holes in the outer portion thereof, a series of brazing-irons secured beneath the holes, a series of plungers adapted to carry the collars and caps, means for forcing said plungers upward so as to carry said caps into contact with the brazing-irons, a series of heaters located above the turn-table and so arranged that the upper surface of said table will act as a slide-valve to cut off the flow of gas from the heaters except when they register with the holes, and means for igniting the gas flowing from said heaters when the holes pass beneath the same, as and for the purpose set forth.

3. In combination with a machine of the character described, a turn-table having a series of holes formed in the outer portion thereof, a series of heaters located immediately above said table in such manner that the upper surface of the latter acts as a valve to cut off the flow of gas issuing from the heaters except when the holes register with the latter, pipes for conveying an admixture of gas and air to the heaters, and a pilot-burner for maintaining a flame in such manner as to ignite the remaining flames when the holes register therewith, as specified.

4. In combination with a turn-table of the machine of the character described, said turn-table having holes formed in the outer portion thereof, of brazing-irons secured to the turn-table immediately beneath said holes, said irons being adapted to receive the caps when forced upward for imparting the proper amount of heat thereto for brazing the caps to the collars, as specified.

In testimony whereof I have hereunto affixed my signature in the presence of two subscribing witnesses.

MILTON R. CAPPS.

Witnesses:
MARY E. HAMER,
S. S. WILLIAMSON.